C. E. RODGERS.
VARIABLE SPEED PLANETARY GEARING.
APPLICATION FILED JULY 7, 1915.
1,185,546.
Patented May 30, 1916.
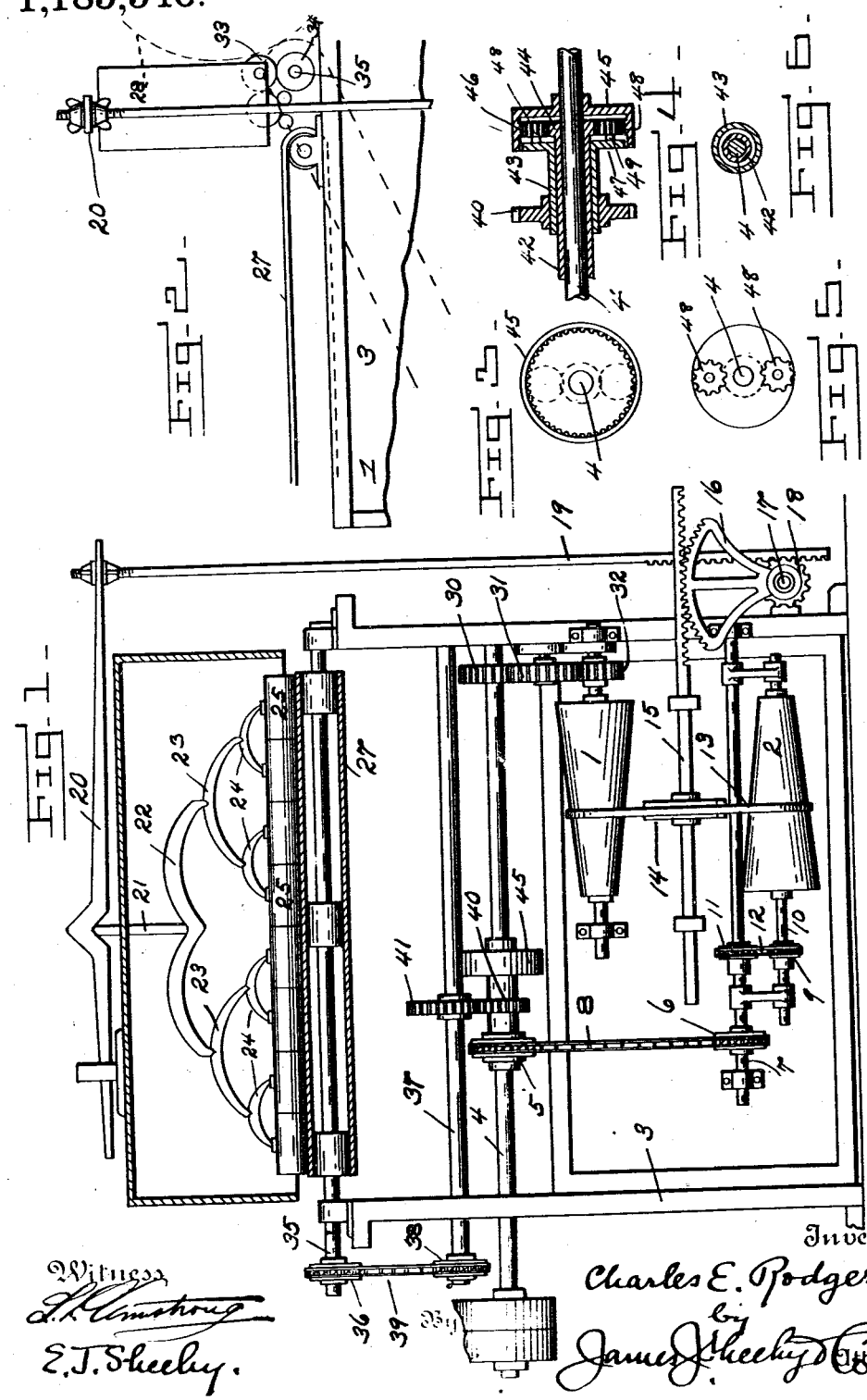

UNITED STATES PATENT OFFICE.

CHARLES E. RODGERS, OF WOONSOCKET, RHODE ISLAND, ASSIGNOR OF ONE-HALF TO JOHN HAMPSON, OF PAWTUCKET, RHODE ISLAND.

VARIABLE-SPEED PLANETARY GEARING.

1,185,546. Specification of Letters Patent. Patented May 30, 1916.

Application filed July 7, 1915. Serial No. 38,588.

*To all whom it may concern:*

Be it known that I, CHARLES E. RODGERS, a citizen of the United States, residing at Woonsocket, in the county of Providence and State of Rhode Island, have invented new and useful Improvements in Variable-Speed Planetary Gearing, of which the following is a specification.

My present invention pertains to variable speed planetary gearing; and it consists in the gearing, hereinafter described and claimed, designed more especially for use in mechanism for driving cotton openers and analogous machinery, with a view to taking strain off the cone belt while automatically regulating the feed of the cotton in accordance with the thickness or condition of the layer of cotton as it passes between rolls or the like into a cotton opener or other machine for treating cotton.

In the drawings, accompanying and forming part of this specification: Figure 1 is a view showing the mechanism constituting the preferred embodiment of my invention. Fig. 2 is a side elevation of a portion of the same. Figs. 3 to 6 are detail views of differential motion mechanism that I employ on the primary drive shaft; Fig. 4 showing the said mechanism in longitudinal section, and Figs. 3, 5 and 6 being taken in planes at right angles to Fig. 4.

Similar numerals of reference designate corresponding parts in all of the views of the drawings.

By comparison of Figs. 1 and 2 it will be seen that I mount reversely-arranged cones 1 and 2 in a suitable framework 3, and arrange to rotate the cone 2 from a sprocket gear 5 loose on a primary drive shaft 4, the connection being through said gear 5, a sprocket gear 6 on a shaft 7, a sprocket belt 8 connecting the gears 5 and 6, a sprocket gear 9 on the cone shaft 10, a sprocket gear 11 on the shaft 7, and a sprocket belt 12 connecting the gears 9 and 11. The cones 1 and 2 are connected by the conventional belt 13 and engaged with the said belt is a belt-shipper 14 on a suitably-guided reciprocatory rack bar 15. Intermeshed with the said rack bar 15 is a gear sector 16, fixed on a shaft 17, and also fixed on the said shaft 17 is a spur gear 18 that is intermeshed with a vertically-disposed rack bar 19. This rack bar 19 is connected, preferably in an adjustable manner with a lever 20, and the said lever 20, in turn, bears on a vertically-disposed bar 21 which is supported by scale beams numbered 22, 23 and 24, respectively. The lowermost and smallest of the scale beams, *i. e.*, the beams numbered 24, each bears at one of its ends on one of the sections of an evener roll 25 between which and lower rolls 26 a layer of cotton is fed by an endless apron 27; the said cotton then passing to a cotton opener or other cotton-treating machine represented by dotted lines and numbered 28.

The sprocket gear 5 before referred to is fixed to the inner sleeve of the differential motion mechanism, hereinafter described in detail. From this it follows that the cone 2 is connected with the differential motion mechanism which, in turn, is connected with the shaft 4 as hereinafter set forth. On the other hand the cone 1 is driven directly from the shaft 4 through the train of gears 30, 31 and 32, Fig. 1.

Arranged in advance of the sectional roll 25 and its complementary lower rolls, are feed rolls 33 and 34, the roll 34 being fast on a shaft 35 which is equipped with a sprocket gear 36 and is driven from a shaft 37 through the medium of a sprocket gear 38 thereon and a sprocket belt 39 which connects the gears 36 and 38. The shaft 37 is driven from the outer sleeve of the differential motion mechanism through the medium of a spur gear 40 on said outer sleeve, and an intermeshed spur gear 41 fixed on the shaft 37.

In addition to the inner sleeve which is numbered 42, and the outer sleeve which is numbered 43, the differential motion mechanism comprises a spur gear 44 on the inner end of the sleeve 42, a casing 45 fast on the shaft 4 and having interior gear teeth 46, a flange 47 loosely arranged in the casing and carried by the outer sleeve 43, and spur gears 48 arranged between and intermeshed with the gear 44 and the teeth 46 and loosely mounted on studs 49 carried by the said flange 47.

In the practical operation of my improvements, a layer of cotton formed upon the apron 27, passes between the sectional evener roll 25 and the rolls 26, and then passes to the feed rolls 33 and 34. In the event of there being a thin place in the layer of cotton the section of roll 25 above said place, will be permitted to move downwardly, and consequently because of the interposed scale beams, the lever 20 will be permitted to drop to a slight extent, whereupon through the rack bar 19, the spur gear 18 and shaft 17, the gear sector 16 and the rack bar 15, the belt shipper 14 and the belt 13, will be moved toward the right, and hence the speed of the lower cone 2 will be increased. At the same time, and through the connection described, the inner sleeve 42 of the differential motion mechanism will be rotated faster and through the described connections the outer sleeve 43 of said mechanism will also be rotated faster and consequently the speed of the cotton-feeding elements will be increased to compensate for the said thinness of the lap.

When there is a bunch or thick place in the lap, the operation described will be reversed and the speed of the cotton-feeding elements will be diminished.

It will be gathered from the foregoing that the power to drive the feed roll 34 is transmitted from the shaft 4 through the casing 45 and outer sleeve 43; the cones 1 and 2 and the means connecting the cone 2 with the inner sleeve 42, serving simply as differential motion means to give and take motion as may be required to give and take speed to and from the feeding-means, whereby the imposition of strain upon the cone belt is avoided and said belt is rendered capable of prompt operation to compensate for the slightest variation in the thickness of the lap.

Having described my invention, what I claim and desire to secure by Letters Patent is:

In a connection between driven parts, the combination of a drive shaft, reversely arranged cone-pulleys, a driving connection between said shaft and one pulley, a sleeve loose on said drive shaft and connected with the other pulley; a spur gear fixed with respect to said sleeve, a belt connecting the pulleys, an outer sleeve loosely surrounding the first-named sleeve, means to be driven connected with said outer sleeve, spur gears carried by the outer sleeve and grouped about and intermeshed with the gear on the inner sleeve, and an internally-toothed gear fast on the drive shaft and surrounding and intermeshed with said spur gears on the outer sleeve.

In testimony whereof I have hereunto set my hand in presence of two subscribing witnesses.

CHARLES E. RODGERS.

Witnesses:
 HERBERT L. SMITH,
 EDGAR L. SPAULDING.